C. C. MEIGS.
APPARATUS FOR MAKING SULFURIC ACID.
APPLICATION FILED AUG. 31, 1910.

UNITED STATES PATENT OFFICE.

CURTIS C. MEIGS, OF WOODBURY, NEW JERSEY.

APPARATUS FOR MAKING SULFURIC ACID.

1,022,493.  Specification of Letters Patent.  Patented Apr. 9, 1912.

Application filed August 31, 1910. Serial No. 579,907.

*To all whom it may concern:*

Be it known that I, CURTIS C. MEIGS, a citizen of the United States, residing at Woodbury, in the county of Gloucester and State of New Jersey, have invented certain new and useful Improvements in Apparatus for Making Sulfuric Acid, of which the following is a specification.

This invention relates to the manufacture of sulfuric acid by the lead chamber process and has particular reference to certain improvements in the apparatus for carrying out this process.

It is known that the action of nitrogen trioxid on sulfur dioxid, oxygen and water is more energetic and effective if the density of the mixture is varied, as by compressing and expanding the mixture in the lead chambers, and that when such variation in density is resorted to, as hereinafter described, a given quantity of nitrogen trioxid will operate more rapidly by acting a greater number of times on successive mixtures of sulfur dioxid, oxygen and water, and will, therefore, produce a greater yield of sulfuric acid for the same quantity of sodium nitrate than when the gases are maintained at a uniform density within the lead chamber. I have found that when the gases are caused to expand and contract in the lead chamber by virtue of the increased action of the nitrogen trioxid the chamber space may be reduced, whereby the expense of the construction and maintenance of the plant may be materially reduced. In accordance with this theory, I provide apparatus for the manufacture of sulfuric acid, comprising one or more lead chambers with means to supply gases used to form the acid to the same, whereby such gases are permitted to expand in the usual way upon entering the chamber, where means are provided within the chamber to compress the gases therein and means also to permit of a second expansion of said gases before leaving the chamber.

Figure 1:
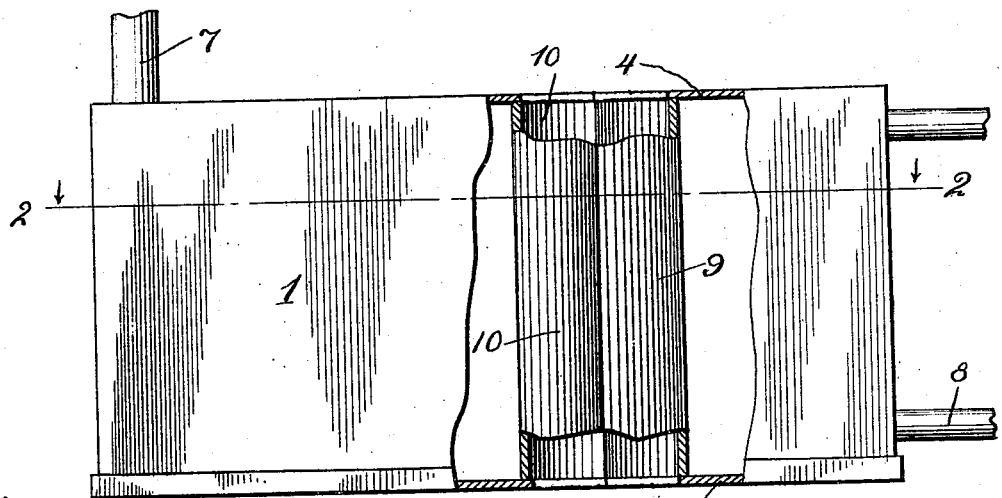
Figure 2:
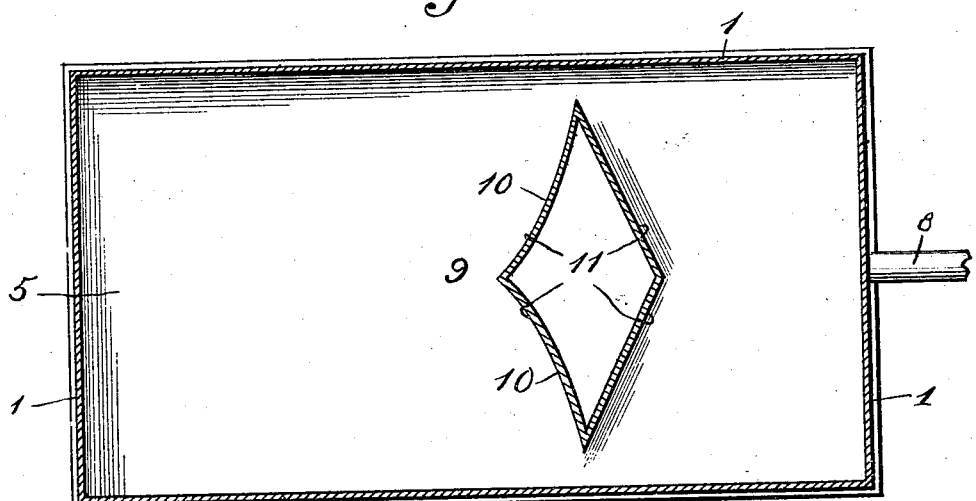

In the accompanying drawings forming a part of this specification, and in which like numerals of reference are employed to designate corresponding parts, throughout the same, Figure 1 is a side elevation of the apparatus in which my process is carried out, and Fig. 2 is a horizontal sectional view taken on line 2—2 of Fig. 1.

In the drawings, wherein is illustrated a preferred embodiment of my invention, the numeral 1 designates a rectangular casing forming a chamber. The sides, top, and bottom of the chamber are lead or any other suitable material, in accordance with the usual practice. The chamber 1 is provided adjacent one end with an inlet pipe 7 which supplies gases to the chamber. At its opposite end, the chamber 1 is provided with a plurality of discharge or outlet pipes 8, as shown.

Disposed within the chamber 1, near its center is a deflector 9 comprising an approximately diamond-shaped baffle or deflector which is vertically disposed, and extends from the top 4 to the floor 5. The deflector is open at top and bottom to allow of the passage of air therethrough, to cool the surface of the deflector. The walls 4 and 5 have openings formed therethrough to register with the open ends of the deflector. The baffle or deflector has two of its four sides concave, as shown at 10, while its opposite sides are straight. The exposed sides of this deflector are lead or any other suitable material, as indicated at 11.

In using this apparatus in the practice of my process the gases employed to form the sulfuric acid are introduced into the chamber 2 through the pipe 7. These gases are compressed to a certain degree while within the pipe 7, but expand upon entering the chamber 2. The gases in their movement through the chamber 2 travel forwardly toward the deflector and impinge upon the concave sides 10 of the same, whereby they are deflected toward the sides of the chamber, and meeting the gases passing along the same, are energetically mixed. The gases then pass around the ends of the deflector which are spaced away from the side walls of the casing 1, as shown, being thereby compressed, and enter that portion of the chamber which is adjacent the discharge pipes 8. After passing the deflector the gases expand within the space between the deflector and the adjacent end wall. Attention is called to the fact that a plurality of these devices are connected in series, that is to say, the discharge pipes 8 will deliver gases into the supply pipe 7 of a second device corresponding to the one herein described. The sulfuric acid formed is collected within the chamber 2, in the usual manner, while the gases pass outwardly through the pipes 8, to be expanded, contracted and condensed.

The pressures of the gases within the chamber 1, upon opposite sides of the deflector 9, are equal. The pressure of the gases when passing the ends of the deflector is materially increased and is substantially equal to the pressure at which such gases are supplied through the pipe 7. Attention is called to the fact that the surfaces of the deflector against which the gases impinge, are concaved, which materially aids in compressing such gases.

By employing my apparatus, the ordinary more complicated apparatus may be dispensed with, including pumps and the like. My apparatus renders the process of making sulfuric acid continuous and expeditious.

It is believed that the pressure of the gases when the same are passing through the contracted space between the ends of the deflector and the walls of the casing 1, is increased several ounces.

While I have specifically described the preferred embodiment of my invention, it is to be understood that such invention is not limited to the specific details set forth, but that numerous changes may be resorted to without departing from the spirit of my invention or the scope of the appended claims.

Having described my invention I claim:—

1. In apparatus of the character described, a casing, a single deflector disposed therein for dividing said casing into two compartments, having communication by means of relatively small passages, said deflector having one side thereof provided with concaved surfaces and the opposite side thereof having straight surfaces, supply and discharge means for said casing arranged near the concaved and straight surfaces of the deflector, respectively.

2. In apparatus of the character described, a casing, a deflector disposed therein intermediate the ends thereof, said deflector being of sufficient width to divide said casing into two compartments, having communication by means of relatively small passages, said deflector having one side thereof provided with oppositely extending concaved surfaces, means to supply gases to said casing to impinge against the curved surfaces, and discharge means for said casing.

In testimony whereof I affix my signature in the presence of two witnesses.

CURTIS C. MEIGS.

Witnesses:
WILLIAM R. STORRIE,
FRANCIS B. DAVIS.

Copies of this patent may be obtained for five cents each, by addressing the "Commissioner of Patents, Washington, D. C."